(12) United States Patent
LaCounte

(10) Patent No.: US 11,999,153 B2
(45) Date of Patent: *Jun. 4, 2024

(54) COMPOSITE LAMINATE RESIN AND FIBERGLASS STRUCTURE

(71) Applicant: TekModo OZ Holdings, LLC, Elkhart, IN (US)

(72) Inventor: Marc Douglas LaCounte, Goshen, IN (US)

(73) Assignee: TekModo OZ Holdings, LLC, Elkhart, IN (US)

( * ) Notice: Subject to any disclaimer, the term of this patent is extended or adjusted under 35 U.S.C. 154(b) by 755 days.

This patent is subject to a terminal disclaimer.

(21) Appl. No.: 16/706,021

(22) Filed: Dec. 6, 2019

(65) Prior Publication Data

US 2020/0180265 A1    Jun. 11, 2020

Related U.S. Application Data

(60) Provisional application No. 62/776,798, filed on Dec. 7, 2018.

(51) Int. Cl.
| | | |
|---|---|---|
| *B32B 5/12* | (2006.01) | |
| *B32B 5/02* | (2006.01) | |
| *B32B 5/26* | (2006.01) | |
| *B32B 37/18* | (2006.01) | |
| *B32B 38/00* | (2006.01) | |
| *B32B 38/04* | (2006.01) | |
| *B32B 3/26* | (2006.01) | |

(52) U.S. Cl.
CPC ............... *B32B 5/26* (2013.01); *B32B 5/022* (2013.01); *B32B 5/024* (2013.01); *B32B 5/12* (2013.01); *B32B 37/18* (2013.01); *B32B 38/0036* (2013.01); *B32B 38/04* (2013.01); *B32B 3/266* (2013.01); *B32B 2038/042* (2013.01); *B32B 2262/101* (2013.01); *Y10T 428/24273* (2015.01)

(58) Field of Classification Search
CPC .................................... B32B 5/26; B32B 5/12
See application file for complete search history.

(56) References Cited

U.S. PATENT DOCUMENTS

| | | | |
|---|---|---|---|
| 6,755,633 | B2 | 6/2004 | Miller |
| 8,540,830 | B2 | 9/2013 | Brentrup |
| 8,894,154 | B2 | 11/2014 | Kulkarni et al. |
| 9,168,855 | B2 | 10/2015 | Evans et al. |
| 10,307,949 | B2 | 6/2019 | Grumm |
| 2010/0239856 | A1 | 9/2010 | Olson et al. |
| 2014/0360344 | A1* | 12/2014 | Pilpel ............... H01M 50/124 428/419 |
| 2016/0279896 | A1 | 9/2016 | Liu et al. |
| 2016/0303824 | A1 | 10/2016 | Takebe et al. |

FOREIGN PATENT DOCUMENTS

| | | |
|---|---|---|
| CN | 106273991 | 1/2017 |
| CN | 206551594 U | 10/2017 |
| CN | 108327375 | 7/2018 |
| CN | 106113531 B | 9/2018 |

* cited by examiner

*Primary Examiner* — William P Watkins, III
(74) *Attorney, Agent, or Firm* — Krieg DeVault LLP; Daniel Tychonievich

(57) ABSTRACT

A structure comprising a composite laminate resin and fiberglass panel and method of manufacture thereof is provided.

20 Claims, 1 Drawing Sheet

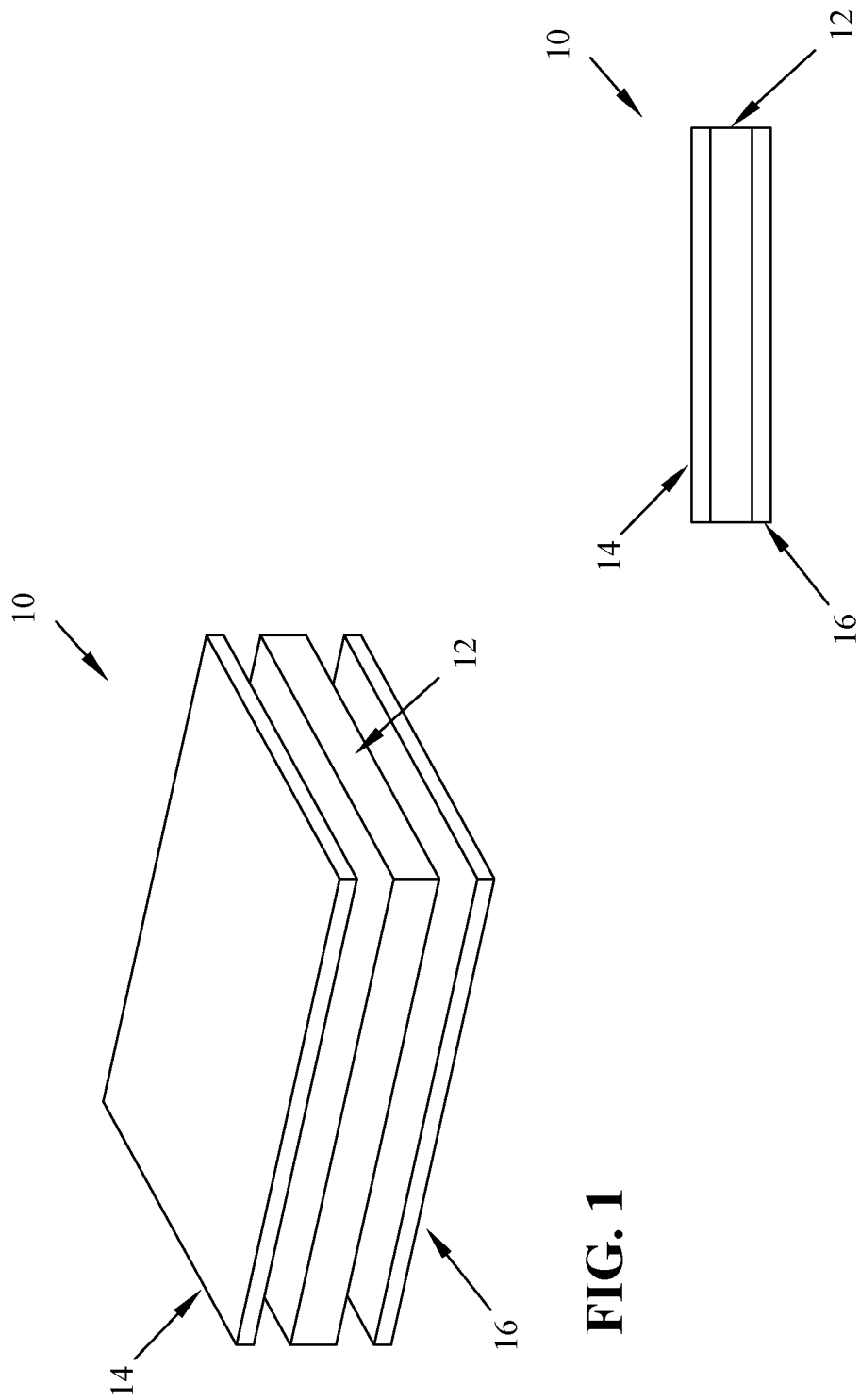

COMPOSITE LAMINATE RESIN AND FIBERGLASS STRUCTURE

This application claims priority from U.S. Provisional Patent Application Ser. No. 62/776,798 filed on Dec. 7, 2018, the complete disclosure of which is incorporated by reference as if fully rewritten herein.

BACKGROUND OF THE INVENTION

The subject invention pertains to a composite laminate resin and fiberglass material and method of manufacturing the composite, and in particular, to a material and process for producing a lightweight, composite material that is particularly suitable for use in recreational vehicles and trucks and conversions thereof.

In the recreational vehicle industry, truck industry, and for conversion vehicles, it is common to use wall panels including fiberglass reinforcement for the exterior surface of a vehicle. The panels may have a variety of widths and commonly fall in an 8 foot to 10 foot range. It is also common to have established lengths for the panels, which include panels that may be as long as 40 feet or even more. Many of the presently used processes are cumbersome from a manufacturing process including many movements of the panels to various stations, which increases the cost thereof. One example of making such panels is disclosed in U.S. Pat. No. 6,755,633 B2 to Miller, the entirety of which is incorporated herein by reference.

In one known and currently used processes, a composite material first begins with utilization of an elongated mold. The mold is somewhat larger in both the width and length, than the panels to be made to facilitate trimming of the panels. The mold surface of the panels is finished to provide a substantially flat and smooth surface, and the surface on the mold may be used to form the visible exterior surface of the panel.

In a known prior art method of manufacturing panels, a mold is first sprayed with a coating known as a gel coating, which cures to form a high gloss exterior surface for the panel. Once cured, a resin and fiberglass are applied to the top surface of the gel coating and then a plurality of panels, typically hard board, such as luan panels, are positioned side by side on top of the fiberglass. The seams between the panels are covered with a seam material and a vacuum bag is placed over the top of the panels and a slight vacuum is introduced which draws resin into luan panels to form a finished product. A completed product is then pulled off the mold and cut and trimmed to the proper size.

One method of applying the gel coating is to maintain the elongated mold in a stationary fashion then move the gel coating sprayer longitudinally along rails and spray the entire length of elongated mold. This can provide a sufficient gel coating on the mold, but due to the movement of the sprayer, capturing the fumes of the gel coating can be difficult. Furthermore, as maintenance of the mold is required, the molds are moved into and out of their various positions by way of an overhead crane, which due to the size of elongated mold, can be a difficult operation. An object of the invention is therefore to overcome the shortcomings of the prior art.

Another moldable fiber-reinforced product and method of producing it is disclosed in U.S. Pat. No. 8,540,830 B2 to Brentrup et al., the entirety of which is incorporated herein by reference. Bentrup et al. discloses a continuous method for producing a thermoplastically moldable semi-finished product of a thermoplastic material and reinforcing fibers. The method includes blending thermoplastic fibers and reinforcing fibers together to form a nonwoven blend, consolidating the nonwoven blend by needling or by a thermal treatment, heating the consolidated nonwoven blend to a temperature above the softening temperature of the thermoplastic, compressing the consolidated nonwoven blend successively in a heated compression mold and in a cooled compression mold at a pressure of less than 0.8 bar for at least 3 seconds, and optionally applying functional layers to the semi-finished product. The preferred product is a thermoplastically moldable semi-finished product of a thermoplastic material and reinforcing fibers with an average length of 20 to 60 mm and an air pore content of 35 to 65 vol. %.

It is an object of the present invention to provide an improved product and method of manufacture.

SUMMARY OF THE INVENTION

In one embodiment of the invention, a composite laminate structure is provided that includes a core of non-woven thermoplastic/fiberglass mix matte, a top layer located on one side of the core, wherein the top layer has a uni-directional structural tape of woven glass/thermoplastic composites, and a bottom layer, located on a side of the core opposite the top layer. The bottom layer includes a uni-directional structural tape of woven glass/thermoplastic composites. The top and bottom layers are sealed to the core.

The top and bottom layers include continuous 0°-90° fiberglass reinforced thermoplastic. The core may include a needle punched matte, and the core includes a thermally treated matte. In one embodiment, the core has an area weight of 100 to 2500 g/m2 and a thickness from 0.5 to 6 mm.

The top and bottom layers can be heat-fused to the non-woven thermoplastic/fiberglass mix matte, and the core can include thermoplastic and reinforcing fibers supplied in the form of multi-fiber strands. The multi-fiber strands can be carded so that, there are few unopened and partially opened strands and the matte has a homogenous appearance. The carded matte may have a lofty appearance prior to sealing it with the top and bottom layers.

In one embodiment, the top and bottom layers have uni-directional continuous composites oriented perpendicular to one another.

In another embodiment of the invention, a method of manufacturing a composite laminate structure includes the steps of providing a core of non-woven thermoplastic/fiberglass mix matte, providing a top layer wherein the top layer includes a continuous 0°-90° fiberglass reinforced thermoplastic; locating the top layer on one side of the core, and providing a bottom layer that includes continuous 0°-90° fiberglass reinforced thermoplastic. The bottom layer is located on a side of the core opposite the top layer, and the top and bottom layers are sealed to the core.

The top layer can include a uni-directional structural tape of woven glass/thermoplastic composites, and the bottom layer can also include uni-directional structural tape of woven glass/thermoplastic composites.

The method of manufacturing a composite laminate structure can also include the step of needle punching the core prior to sealing to the top and bottom layers.

The method of manufacturing a composite laminate structure may also include the step of thermally treating the matte prior to sealing it to the top and bottom layers. In one embodiment, the core has an area weight of 100 to 2500 g/m2 and a thickness from 0.5 to 6 mm.

The method of manufacturing a composite laminate structure can also include the steps of heat fusing the top and bottom layers to the non-woven thermoplastic/fiberglass mix matte, and supplying thermoplastic and reinforcing fibers in the form of multi-fiber strands, blending the multi-fiber strands in an air stream, and depositing the multi-fiber strands on a moving belt, The method of manufacturing a composite laminate structure can also include the steps of carding multi-fiber strands to reduce unopened and partially opened strands and providing the matte in a homogenous appearance.

In one embodiment, the method of manufacturing a composite laminate structure includes the step of orienting the uni-directional fiberglass reinforced thermoplastic in the top and bottom layers perpendicular to one another.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 1 is an exploded perspective view of a composite laminate resin and fiberglass structure in accordance with one embodiment of the subject invention; and FIG. 2 is a side view of the composite laminate resin and fiberglass structure of FIG. 1 and an assembled condition.

Corresponding reference characters indicate corresponding parts if there are more than one view. Although the drawing(s) represent an embodiment of the present invention, the drawing(s) are not necessarily to scale and certain features may be exaggerated in order to better illustrate and explain the present invention. The exemplification set out herein illustrates an embodiment of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawing(s), which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIGS. 1 and 2, a multi-layer fiberglass reinforced thermoplastic composite or structure, designed for lightweight composite panel applications, is disclosed and shown generally indicated in an exploded view as 10.

The core material consists of a needle punched and/or thermally treated, non-woven thermoplastic/fiberglass mix matte, generally indicated as 12. In one method of making such a thermoplastic/fiberglass mix matte, the thermoplastic and reinforcing fibers can be supplied in the form of multi-fiber strands, blended in an air stream, and deposited on a moving belt. The fibers, which at this stage can be in the form of strands, partially opened strands, and fibers, can be subjected to one or more carding operations. Following carding, the number of unopened and partially opened strands is low, so that the mat appears to be relatively homogenous. Following needling, a very homogenous appearance is achieved, with virtually no strands observable to the eye. The mat product is lofty. The fibers can be long or short as is known in the art. In one embodiment, the core material 12 has an area weight of 100 to 2500 g/m2 and a thickness from 0.5 to 6 mm.

The core material 12 is sandwiched between top and bottom layers, generally indicated as 14, 16, respectively. In a preferred embodiment, good strength is achieved through the use of continuous 0°-90° fiberglass reinforced thermoplastic composite skins as top and bottom layers 14 and 16. In particular, uni-directional structural tape of woven glass/thermoplastic composites can be used for top and bottom layers.

In one method of manufacturing the multi-layer fiberglass reinforced thermoplastic composite or structure 10, the skins or top and bottom layers 14, 16 are heat-fused to lightweight fiberglass reinforced thermoplastic non-woven, needled-punched core 12. This creates an "I-Beam" type composite that is lightweight yet stiff.

The construct 10 displays excellent impact strength and flexural stiffness, while using a lightweight construct. The core density, resin to fiber reinforcement ratio, fiber placement, fiber size/type and core thickness can be tailored to meet desired mechanical properties. Furthermore, the skin density, resin to fiber reinforcement ratio, fiber placement/alignment, fiber size/type and skin thickness can be tailored to meet different mechanical properties While the invention has been taught with specific reference to these embodiments, one skilled in the art will recognize that changes can be made in form and detail without departing from the spirit and scope of the invention. Therefore, the described embodiments are to be considered in all respects only as illustrative and not restrictive. As such, the scope of the invention is indicated by the following claims rather than by the description.

The invention claimed is:

1. A composite laminate structure comprising:
a core of non-woven thermoplastic/fiberglass mix matte having a homogenous appearance, with virtually no strands observable to the eye;
a top layer located on one side of said core, said top layer including uni-directional structural tape of woven glass/thermoplastic composites wherein a majority of fibers of said uni-directional structural tape on said top layer run in a first direction; and
a bottom layer, on a side of said core opposite said top layer, said bottom layer including uni-directional structural tape of woven glass/thermoplastic composites wherein a majority of fibers of said uni-directional structural tape on said bottom layer run in a second direction, said second direction being at an angle greater than 45 degrees to said first direction, said top and bottom layers are sealed to said core in a laminating process to form a laminate.

2. The composite laminate structure of claim 1 wherein said first direction of said top and said second direction of said_bottom layers run 0°-90° to one another.

3. The composite laminate structure of claim 2 wherein the core includes a needle punched matte.

4. The composite laminate structure of claim 2 wherein the core includes a thermally treated matte.

5. The composite laminate structure of claim 2 wherein the core has an area weight of 100 to 2500 g/m2 and a thickness from 0.5 to 6 mm.

6. The composite laminate structure of claim 2 wherein the top and bottom layers are heat-fused to the non-woven thermoplastic/fiberglass mix matte.

7. The composite laminate structure of claim 2 wherein the core includes thermoplastic and reinforcing fibers supplied in the form of multi-fiber strands.

8. The composite laminate structure of claim 7 wherein multi-fiber strands are carded so that, there are few unopened and partially opened strands and the matte has a homogenous appearance.

9. The composite laminate structure of claim 8 wherein the carded matte has a lofty appearance prior to sealing with said top and bottom layers.

10. The composite laminate structure of claim 1 wherein said top and bottom layers uni-directional continuous composites are oriented perpendicular to one another.

11. A method of manufacturing a composite laminate structure including the steps of:
   providing a core of non-woven thermoplastic/fiberglass mix matte having a homogenous appearance, with virtually no strands observable to the eye;
   providing a top layer said top layer including a uni-directional fiberglass reinforced thermoplastic wherein a majority of fibers of said uni-directional structural tape on said top layer run in a first direction;
   locating said top layer on one side of said core;
   providing a bottom layer, said bottom layer including a uni-directional fiberglass reinforced thermoplastic wherein a majority of fibers of said uni-directional structural tape on said bottom layer run in a second direction, the second direction running 45°-90° to the first direction;
   locating said bottom layer on a side of said core opposite said top layer;
   sealing said top and bottom layers to said core using a heat fusing process to create an "I" Beam type composite structure, and thereby laminating said top layer, to said core and said core to said bottom layer to form a laminate.

12. The method of manufacturing a composite laminate structure as set forth in claim 11 wherein said top layer includes uni-directional structural tape of woven glass/thermoplastic composites.

13. The method of manufacturing a composite laminate structure as set forth in claim 12 wherein said bottom layer includes uni-directional structural tape of woven glass/thermoplastic composites.

14. The method of manufacturing a composite laminate structure as set forth in claim 13 including the step of needle punching said core prior to sealing to said top and bottom layers.

15. The method of manufacturing a composite laminate structure as set forth in claim 13 including the step of thermally treating said matte prior to sealing to said top and bottom layers.

16. The method of manufacturing a composite laminate structure as set forth in claim 13 wherein the core has an area weight of 100 to 2500 g/m2 and a thickness from 0.5 to 6 mm.

17. The method of manufacturing a composite laminate structure as set forth in claim 13 including the step of heat fusing said top and bottom layers to said non-woven thermoplastic/fiberglass mix matte.

18. The method of manufacturing a composite laminate structure as set forth in claim 13 including the steps of supplying thermoplastic and reinforcing fibers in the form of multi-fiber strands, blending the multi-fiber strands in an air stream, and depositing the multi-fiber strands on a moving belt.

19. The method of manufacturing a composite laminate structure as set forth in claim 13 including the steps of carding multi-fiber strands to reduce unopened and partially opened strands and providing the matte in a homogenous appearance.

20. The method of manufacturing a composite laminate structure as set forth in claim 13 including the step of orienting said uni-directional fiberglass reinforced thermoplastic in said top and bottom layers perpendicular to one another.

\* \* \* \* \*